9259X
D. Evans,
Railroad Turn Table,
Patented Nov. 26, 1835
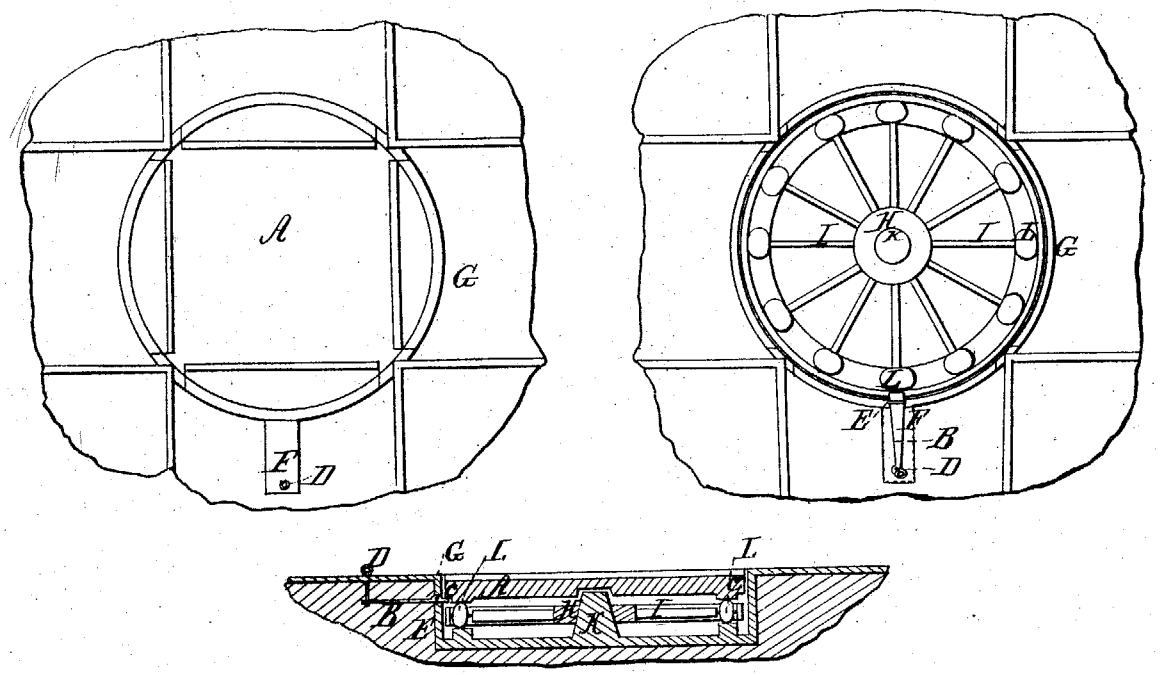

David Evans of Philadelphia, Pennsylvania

Letters Patent

The schedule referred to in these Letters Patent and making part of the same containing a description in the words of the said David Evans himself of his improve=ment in the Turning platform for Turning cars and Locomotives on Rail Roads.

To all to whom these presents shall come,

Be it known that I David Evans of Penn Township in the County of Philadelphia and State of Pennsylvania Black=smith have invented a new and useful improvement in turning platforms for turning Rail road cars and Loco-motives engines on rail roads and that the following is a full and exact description of the construction and operation of said machine, as invented or improved by me.

A turning platform for turning rail road cars and locomotive engines on rail roads, that is to be made of wood or any other suitable material with a solid curb=ing of Iron all round it, as model and drawings will show and to be regulated or stopped by a self tending safety lever connected therewith, on conical balls with holes or axles which conical balls are guided by the main centre by means of bars extending from it, the main centre to a hoop on the outer circumference Now the part or parts which I claim as my invention or improvement is the application of the conical balls with holes or axles and the guidance of them by the main centre by means of the bars extending therefrom to the hoop on the outer circumference and the self tending safety lever for regulating or stopping this or any other platform on the principle

370.

9259X of my drawing or Models

David Evans

Witnesses

A. H. Hamilton

John Warner.

(Drawing)

Ex 158

320 wds